United States Patent
Sadhasivam et al.

(10) Patent No.: US 8,161,554 B2
(45) Date of Patent: Apr. 17, 2012

(54) SYSTEM AND METHOD FOR DETECTION AND MITIGATION OF NETWORK WORMS

(75) Inventors: Karthikeyan M. Sadhasivam, San Jose, CA (US); Shuguang Zhang, Sunnyvale, CA (US); Ravi K. Varanasi, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1426 days.

(21) Appl. No.: 11/114,575

(22) Filed: Apr. 26, 2005

(65) Prior Publication Data
US 2006/0242705 A1 Oct. 26, 2006

(51) Int. Cl.
*G06F 11/00* (2006.01)

(52) U.S. Cl. ........... 726/23; 726/22; 726/24; 726/25; 726/26; 713/189; 713/190; 713/191; 713/192; 713/193; 717/174; 717/175; 717/176; 717/177; 717/178; 705/51; 705/52; 705/53; 705/54

(58) Field of Classification Search ............ 726/22–26; 713/189–194; 717/174–178; 705/51–54
See application file for complete search history.

(56) References Cited

U.S. PATENT DOCUMENTS

| | | | |
|---|---|---|---|
| 6,154,775 A | 11/2000 | Coss et al. | |
| 6,715,084 B2 | 3/2004 | Aaron et al. | |
| 6,851,060 B1 | 2/2005 | Shrader | |
| 7,472,418 B1 * | 12/2008 | McCorkendale et al. | 726/24 |
| 7,493,659 B1 * | 2/2009 | Wu et al. | 726/26 |
| 7,565,550 B2 * | 7/2009 | Liang et al. | 713/188 |
| 2002/0055912 A1 | 5/2002 | Buck | |
| 2002/0107958 A1 | 8/2002 | Faraldo, II | |
| 2002/0164023 A1 * | 11/2002 | Koelle et al. | 380/201 |
| 2003/0145232 A1 | 7/2003 | Poletto et al. | |
| 2003/0200464 A1 | 10/2003 | Kidron | |
| 2004/0011635 A1 | 1/2004 | Adams | |
| 2005/0086520 A1 * | 4/2005 | Dharmapurikar et al. | 713/201 |
| 2006/0168239 A1 * | 7/2006 | Gauthier | 709/227 |

* cited by examiner

*Primary Examiner* — Edan Orgad
*Assistant Examiner* — Roderick Tolentino
(74) *Attorney, Agent, or Firm* — Baker Botts L.L.P.

(57) ABSTRACT

An intrusion detection system for a computer network includes a knowledge database that contains a baseline of normal host behavior, and a correlation engine that monitors network activity with reference to the knowledge database. The correlation engine accumulating information about anomalous events occurring on the network and then periodically correlating the anomalous events. The correlation engine generates a worm outbreak alarm when a certain number of hosts exhibit a role-reversal behavior. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

17 Claims, 6 Drawing Sheets

SYSTEM AND METHOD FOR DETECTION AND MITIGATION OF NETWORK WORMS

FIELD OF THE INVENTION

The present invention relates generally to digital computer network technology; more particularly, to intrusion detection systems for network-based computer systems.

BACKGROUND OF THE INVENTION

With the rapid growth of the Internet and computer network technology in general, network security has become a major concern to companies around the world. The fact that the tools and information needed to penetrate the security of corporate networks are widely available has only increased that concern. Because of the increased focus on network security, network security administrators often spend more effort protecting their networks than on actual network setup and administration.

Confidential information normally resides in two states on a computer network. It can reside on physical storage media, such as a hard disk or memory of a device such as a server, or it can reside in transit across the physical network wire in the form of packets. A packet is a block of data that carries with it the information necessary to deliver it, analogous to an ordinary postal letter that has address information written on the envelope. A data packet switching network uses the address information contained in the packets to switch the packets from one physical network connection to another in order to deliver the packet to its final destination. In modern computer network technology, network nodes such as gateway devices, routers, and switches are commonly utilized to forward data packets toward their destinations. The format of a packet is usually defined according to a certain protocol. For example, the format of a packet according to the widely-used Internet protocol (IP) is known as a datagram.

Computer viruses and worms are two types of malicious programs designed to attack and compromise the security of a network. A computer virus attaches itself to a program or file so it can spread from one computer to another through the process of sharing infected files or sending e-mails with viruses as attachments in the e-mail. Most often, viruses are attached to an executable file, which means the virus may exist on a computer or network node but it cannot damage the computer's hardware, software, or files unless a user runs or opens the malicious program.

A worm is similar to a virus by its design, but is much more insidious than a virus insomuch as it has the ability to propagate without direct human action (such as running an infected program). A worm takes advantage of file or information transport features on a computer system, which allows it to rapidly propagate throughout a network unaided. A big danger with a worm is its ability to replicate itself so that a single host computer can send out hundreds or thousands of copies of the worm to other computers in the network, thereby creating a huge devastating effect. For example, a worm may scan hundreds of computer nodes across a local access network (LAN) looking for a vulnerable host. When a worm finds a vulnerable hose, it tries to infect it and continue the replication process down the connectivity line.

A worm's ability to propagate itself rapidly (and often surreptitiously) is essential to its success in disrupting the integrity of a network by compromising Web servers, network servers, and individual computers. For example, the recent "MySQL" worm attack was reported to have infected approximately 4,500 computer systems per hour in the early hours following outbreak. Detection of a worm may occur when the worm starts consumes large amounts of system memory or network bandwidth, which may cause certain network nodes to stop responding. Evidence of a worm attack may also be found in a significant upsurge in scans performed on a particular port of a network device. For example, a past outbreak of the MySQL worm was evidenced by a massive number of port 3306 scans during a relatively short time period.

Current Intrusion Detection System (IDS) or Intrusion Prevention System (IPS) technologies usually discover worm attacks via comparisons of network traffic against known attack signatures. Basically, data packets traveling across the network are inspected for the presence of a particular byte signature associated with a known worm. Knowledge of the worm's signature is typically obtained by extensive analysis of the malicious code after it has been detected on a victim network. This conventional worm detection technique is described in U.S. Patent Application No. 2005/0022018, which teaches a system for detecting and preventing the spread of malicious code in which a local analysis center provides a signature update to a network IDS. Another signature technique is described at http://www.cs.ucsd.edu/Dienst/UI/2.0/Describe/ncstrl.ucsd_cse/CS2003-0761.

Figure 1:
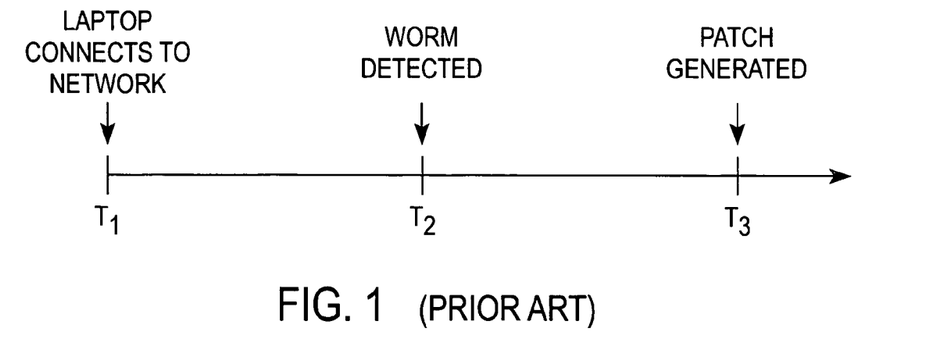
FIG. 1 is a timeline that illustrates a prior art signature-based worm detection approach.

The signature update approach to detecting and stopping a worm attack is illustrated in FIG. 1, which shows a timeline of a worm's propagation in an enterprise network. The example of FIG. 1 begins with an infected laptop computer connecting to a corporate network at time $T_1$. As soon as the laptop connects to the network, the worm starts replicating itself by infecting nearby hosts. The worm continues to spread in an undetected manner until the time, $T_2$, when network users or a system administrator first reports a problem with network operations or with particular computer nodes. At this point, the arduous and time-consuming process of manually analyzing and reverse-engineering the worm begins. Once a corresponding signature of the worm has been identified, a small piece of software (known as a "patch") designed to fix or shore up the vulnerability is then installed onto each and every node of the network. The creation of a patch is shown occurring at time $T_3$ in FIG. 1.

One problem with existing signature update approaches is that it usually takes a long time (e.g., 4-5 hours) to generate a working patch after a worm has been detected. During this interval (e.g., from $T_2$ to $T_3$) the worm may continue to spread and infect tens of thousands of additional computers. Another drawback is that signature databases must be constantly updated, and the intrusion detection system must be able to compare and match activities against large collections of attack signatures. That is to say, a signature-based IDS only operates on known attacks. In addition, if signatures definitions are too specific the IDS may miss variations or mutations of known attacks. The signatures also need to be configured for each branch/installation of the network. For a large corporation the overhead associated with maintaining the signature database information can be very costly.

Profile-based intrusion detection, sometimes called anomaly detection, is another security methodology that has been used to detect malicious network activity. Anomaly detection systems examine ongoing network traffic, activity, transactions, or behavior for anomalies on networks that deviates from a "normal" host-host communications profile. By keeping track of the services used/served by each host and the relationships between hosts, anomaly-based intrusion detection systems can observe when current network activity deviates statistically from the norm, thereby providing an indicator of attack behavior.

U.S. Pat. No. 6,681,331 teaches a dynamic software management approach to analyzing the internal behavior of a system in order to assist in the detection of intruders. Departures from a normal system profile represent potential invidious activity on the system. U.S. Pat. No. 6,711,615 describes a method of network surveillance that includes receiving network packets (e.g., TCP) handled by a network entity and building long-term and short-term statistical profiles. A comparison between the building long-term and short-term profiles is used to identify suspicious network activity.

One problem with conventional anomaly detection systems is that the baseline of normal behavior can easily change, causing anomaly-based IDS systems to be prone to false positives where attacks may be reported based on events that are in fact legitimate network activity, rather than representing real attacks. (A false negative occurs when the IDS fails to detect malicious network activity. Similarly, a true positive occurs when the IDS correctly identifies network activity as a malicious intrusion; a true negative occurs when the IDS does not report legitimate network activity as an intrusion.) Traditional anomaly detection systems can also impose heavy processing overheads on networks.

By way of further background, U.S. Pat. No 6,785,818 teaches a programmable control module adapted to determine when a change in mapping constitutes a malicious code attack. U.S. Pat. No 6,681,331 teaches a dynamic software management approach to analyzing the internal, normal behavior of a system in order to assist in the detection of intruders. U.S. Pat. No 6,711,615 describes a method of network surveillance that includes receiving network packets (e.g., TCP) handled by a network entity and building long-term and short-term statistical profiles. A comparison between the building long-term and short-term profiles is used to identify suspicious network activity. A network surveillance system that compares statistical profiles to identify suspicious network activity is disclosed in U.S. Pat. No 6,708,212.

Thus, there remains an unsatisfied need for an intrusion detection system and method capable of quickly detecting a worm attack, as distinguished from legitimate network behavior, and mitigating the effects of the attack.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system and method for real-time detection of a network worm attack is described. In the following description specific details are set forth, such as devices, protocols, configurations, etc., in order to provide a thorough understanding of the present invention. However, persons having ordinary skill in the networking arts will appreciate that these specific details may not be needed to practice the present invention.

Figure 2:
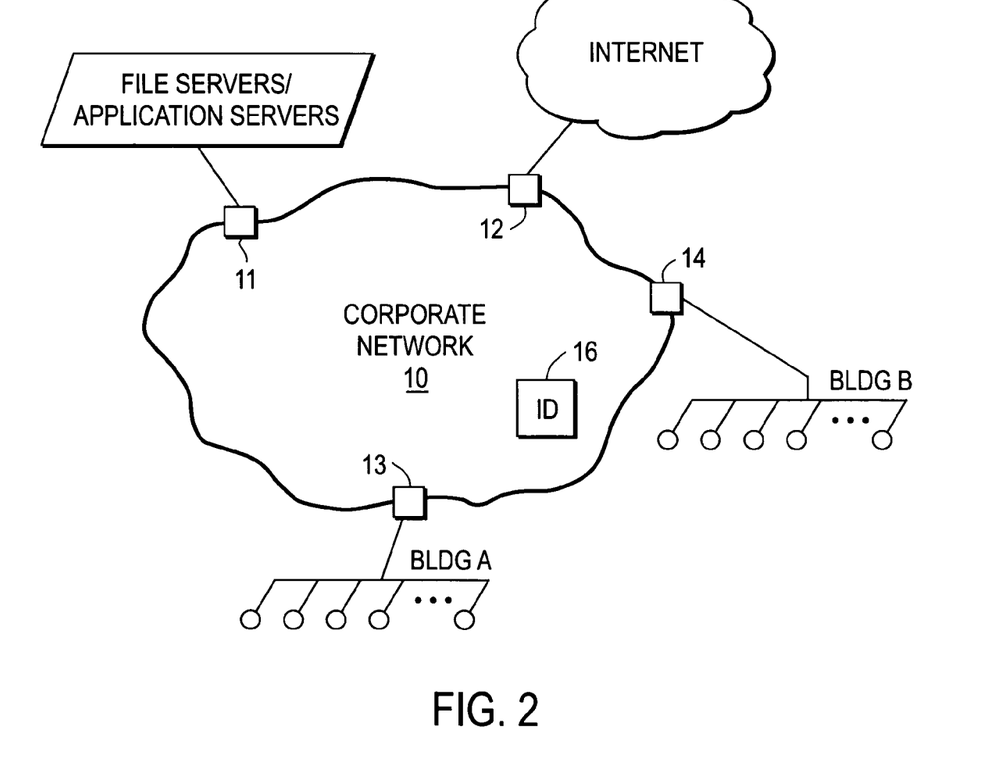
FIG. 2 is a diagram of a typical corporate network configuration in accordance with one embodiment of the present invention.

FIG. 2 is an exemplary network with an intrusion detection system in accordance with one embodiment of the present invention. A core corporate network 10 is shown having a plurality of nodes or devices that provide a gateway to various services, servers, applications, and sub-networks. For example, device 11 is shown connected with a set of file servers and/or application servers; device 12 connects network 10 with an outside network (e.g., the Internet); and devices 13 & 14 provide a gateway to computer nodes remotely located in corporate buildings "A" & "B", respectively. Also included in the diagram of FIG. 2 is an intrusion detection (ID) device 16 that embodies intrusion detection hardware/firmware/software that includes anomaly detection (AD) functionality in accordance with one embodiment of the present invention. Alternatively, the intrusion detection function of device 16 can be distributed among one or more of network devices that act as traffic gateways. In still other embodiments, a method of intrusion detection according to the present invention may be implemented in machine-readable code stored in firmware, software, on a hard disk, etc., for execution on a general purpose processor.

Figure 3:
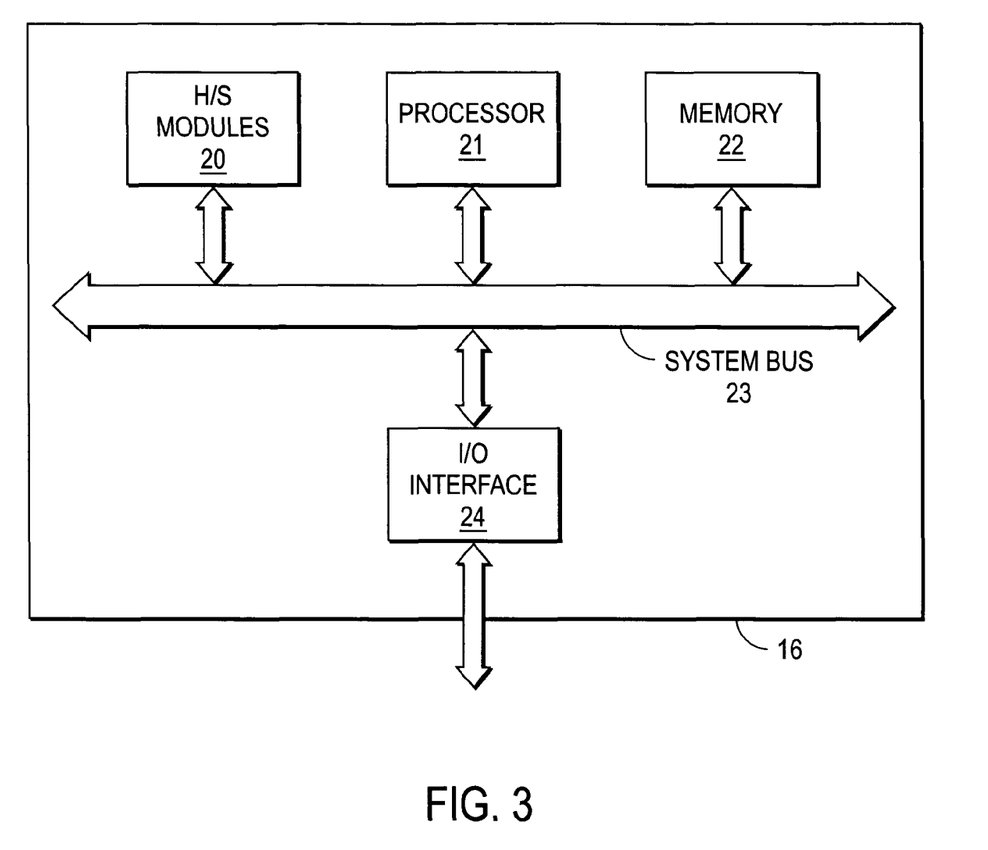
FIG. 3 is a block diagram showing the basic architecture of a network intrusion detection device according to one embodiment of the present invention.
Figure 4:
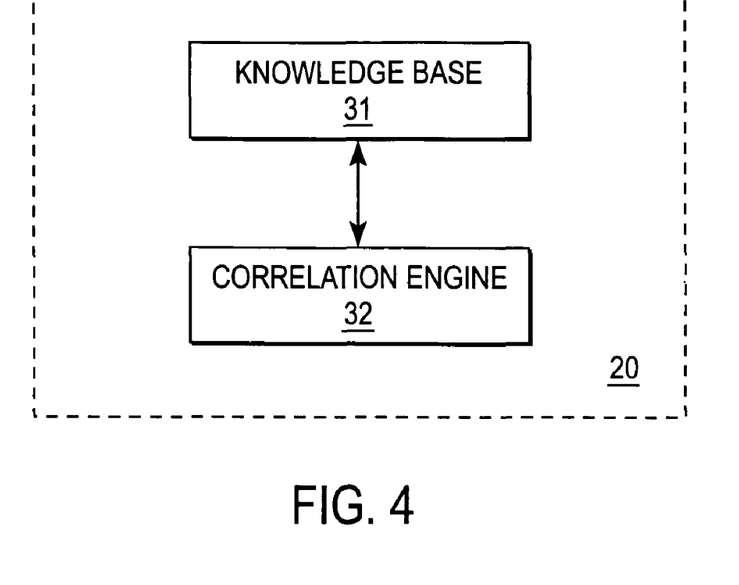
FIG. 4 is a conceptual diagram of a module with knowledge database and correlation engine components according to one embodiment of the present invention.

FIG. 3 is a generalized block diagram showing an exemplary ID device 16 that includes a processor 21 coupled with a memory unit 22, one or more hardware/software modules 20, and an input/output (I/O) interface 24 via a system bus 23. Modules 20 implement an IDS/IPS with anomaly detection (AD) using a knowledge database 31 coupled to a correlation engine 32, as depicted in FIG. 4. It is appreciated that knowledge database 31 and correlation engine 32 may comprise separate hardware devices coupled to the system bus 23, or, alternatively, knowledge database 31 and correlation engine 32 may be implemented as software programs or modules that run on one or more processors. In other words, the AD engine may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

As previously explained, the IDS/IPS of the present invention may also be distributed in the network, rather than residing on a single node or device 16. Another possibility is to implement the knowledge database and correlation engine functions on various gateway nodes of the network.

In accordance with one embodiment of the present invention knowledge database 31 is generated by gathering information about normal network activity over a period of time (e.g., 4-6 hours) for the purpose of creating an activity baseline. That is, knowledge database 31 summarizes information about the kind and frequency of traffic generated by each and every node in the network. A baseline of normal behavior of the various network elements is then maintained in memory. In most cases, learning continues as the network is constantly monitored, new behaviors are detected, and the store of network activity and behavior is dynamically updated to track normal changes in host relations and network activity. In other words, the knowledge database of normal activity need not be static; it may evolve over time as the network is reconfigured, expands, new users are added, etc.

Figure 6:
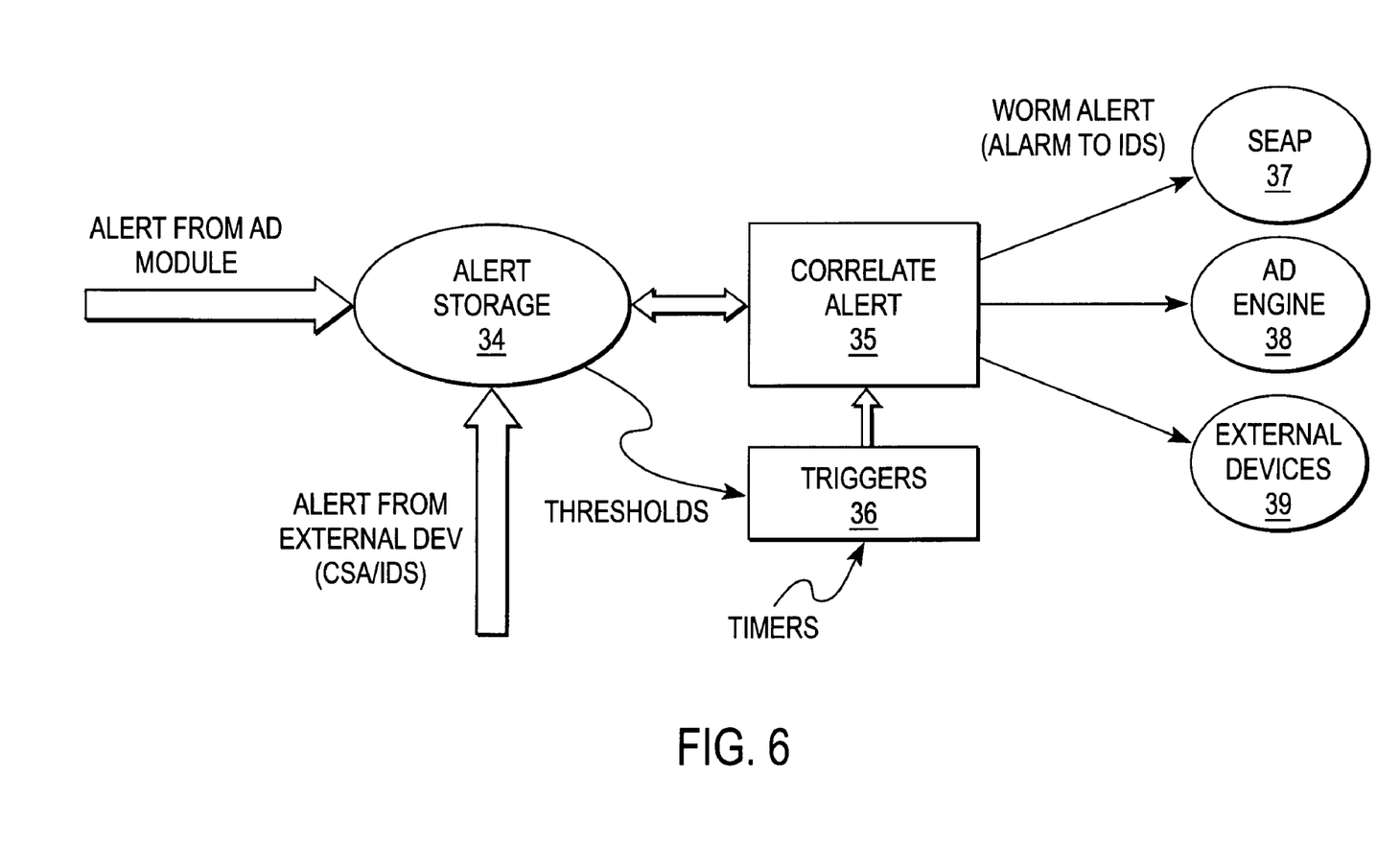
FIG. 6 is a block diagram that illustrates worm alert correlation and alert alarms according to one embodiment of the present invention.

When the AD engine of ID device 16 observes anomalous or abnormal behavior (i.e., activity that deviates from the baseline of normal activity) on the network, correlation engine 32 records the abnormality by an entry in an alert memory or storage unit 34 (see FIG. 6). Note that an alert event may also be produced by an external device, such as an IDS associated with a sub-network or a computer system administrator (CSA). Once an alert event is produced, either by an AD module or another external device, correlation engine 32 begins tracking the abnormality to determine whether the abnormality represents legitimate or malicious network activity.

There may be many valid reasons why a host deviates from its normal network activities. Examples include cases where the corporate network is reconfigured, or a new website is launched. Another example of activity that is not malicious, but outside of the bounds of daily normal activity, is where a host resets a password or other credentials. Because a given AD alert of abnormal behavior does not necessarily indicate a worm outbreak, correlation engine 32 tracks the abnormality to determine whether the particular behavior or activity is repeated or spreads in a pattern across the network.

Figure 5:
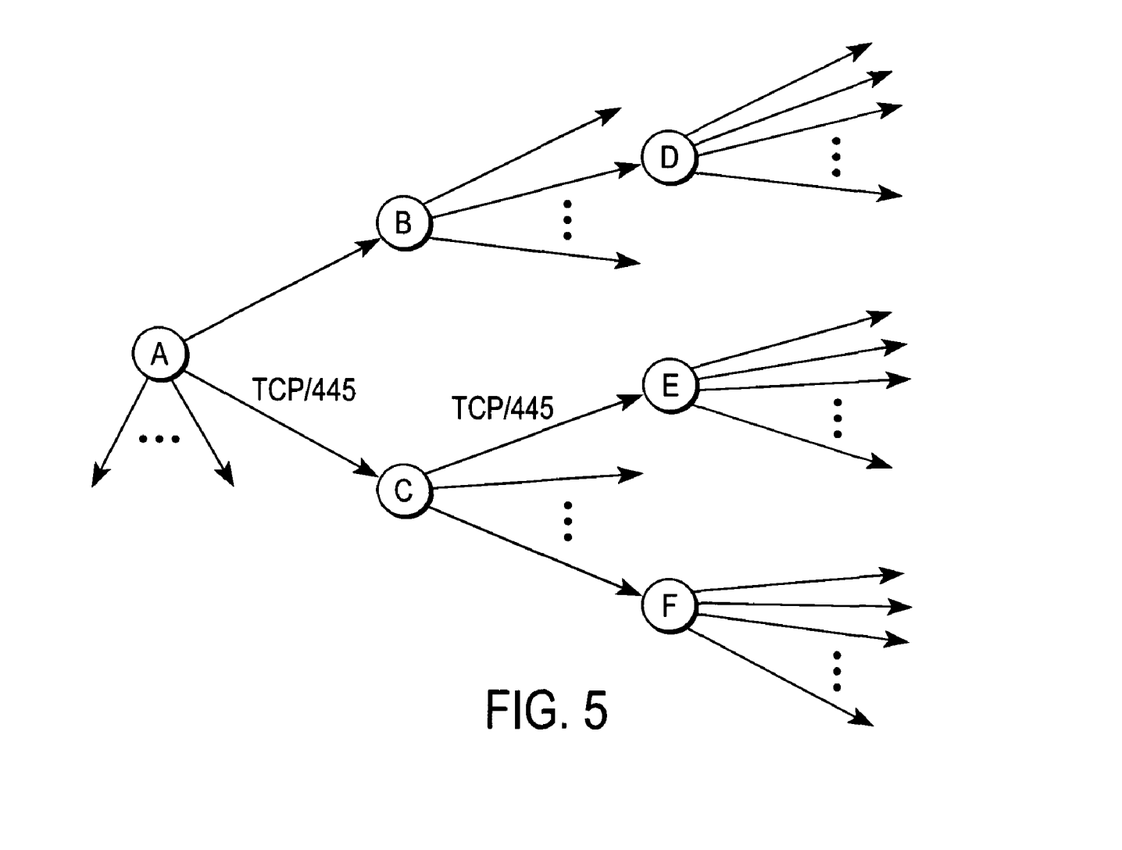
FIG. 5 is a network node diagram showing propagation across a network of a worm having a particular infection vector.

FIG. 5 is a network diagram showing propagation of a worm having a particular infection (i.e., attack) vector through a plurality of nodes A-F. Assume that the AD module of ID device 16 observes host "A" communicating with host "B" using a particular application or protocol, and that such communications have never been observed previously. This abnormal activity event is recognized by correlation engine 32 and the event information is stored in alert storage 34 (see FIG. 6). The particular attack vulnerability shown in FIG. 5 is on Transmission Control Protocol port 445 (TCP/445). Assume further that another AD alert event is generated when host "A" communicates with host "C" using the same application. At this point, the correlation engine not only recognizes that another abnormality occurred, but also that a pattern is emerging, i.e., host "A" communicating with another host using the same application or protocol.

According to the present invention, correlation engine 32 includes a unit or module (shown by block 35 in FIG. 6) for correlating alert events in order to identify patterns in abnormal behavior. When the pattern repeats itself in a certain manner, a worm alert alarm signal is generated. Periodic correlation of alerts is shown in FIG. 6 by correlation unit 35 coupled with alert storage 34. Unit 35 generates a worm alert alarm output signal when a certain number of hosts exhibit behavior that exceeds a predetermined threshold. The trigger point mechanism (as represented by block 36) may also be made dependent upon activity that exceeds a particular threshold of normal behavior within a set time period. In other words, since worms tend to propagate very rapidly, infrequent AD events stretched out over long time periods may be ignored by the ID system.

In the embodiment shown, the worm alert alarm signals generated by unit 35 include a list of infected hosts and protocols involved in the worm attack. Outputs may be sent to a signature event action processor (SEAP) 37, AD engine 38, as well as various external devices 39. SEAP 37 is responsible for coordinating the data flow from the signature event in the alarm channel to an event handler designed to take action mitigating spread of the worm. The output to AD engine 38 may notify the knowledge database with information about the infected hosts.

Continuing with the example of FIG. 5, hosts "B" and "C" are shown exhibiting the same type of behavior as host "A". The same pattern is then repeated on hosts "D", "E", and "F". Correlation engine 32 accumulates these alert events related to the various hosts and new usages; it then periodically examines and correlates these events to determine when a new worm attack is present on the network. According to the present invention, a worm outbreak is declared when correlation engine 32 discovers a predetermined number of hosts exhibiting role-reversal behavior involving a common protocol within a given time period. In other words, when the number of hosts exhibiting role-reversal behavior exceeds a certain threshold, correlation engine 32 declares a worm outbreak using the associated protocol.

Figure 7:
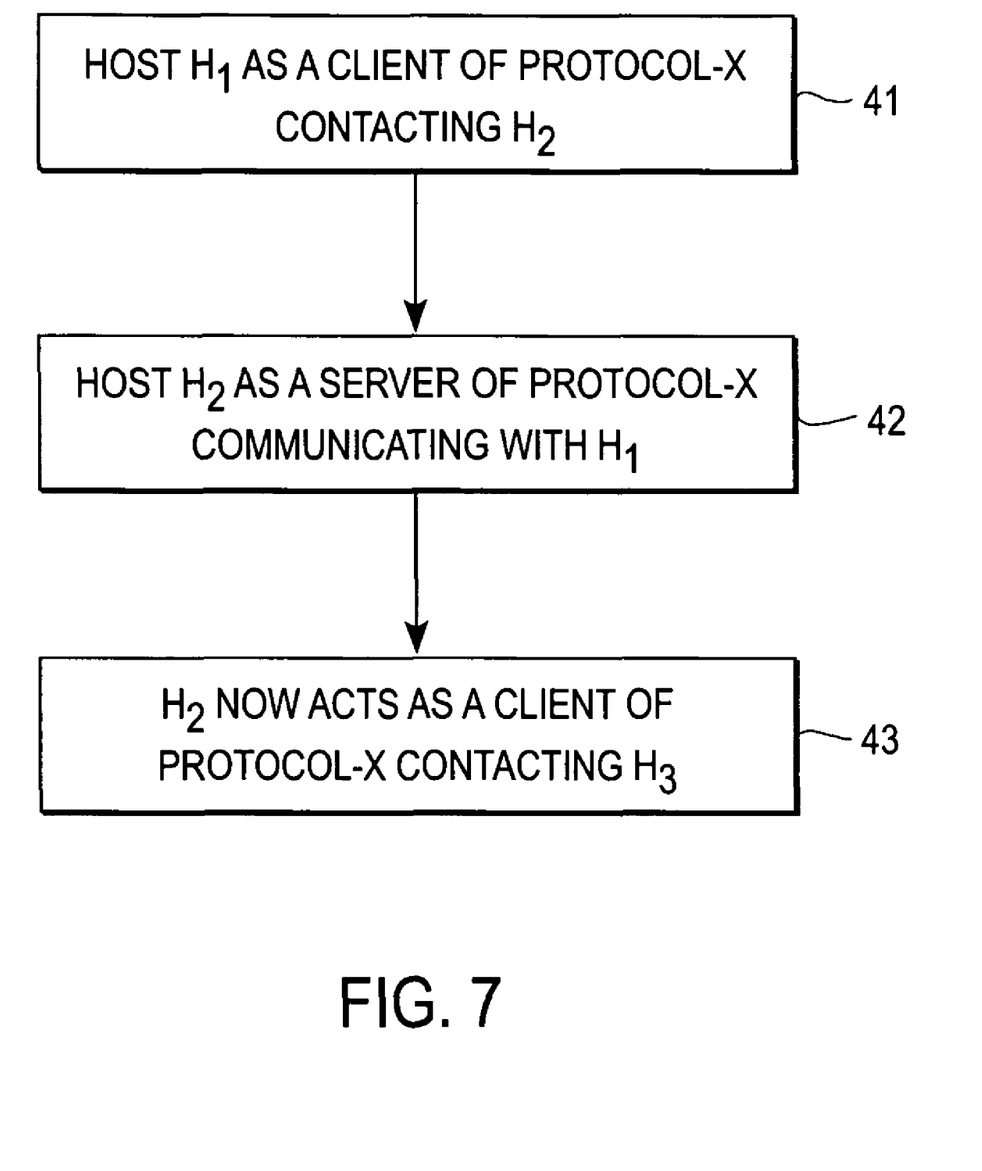
FIG. 7 is a flowchart showing a generalized worm detection process according to one embodiment of the present invention.

FIG. 7 is a flowchart that illustrates a sequence of events in the real-time worm detection method according to one embodiment of the present invention. Assume that a compromised host $H_1$ is trying to spread a worm across the network by communicating with hundreds of new hosts. When $H_1$ is successful in infecting one of its victims, say, host $H_2$, the victim then repeats the process by contacting hundreds of new hosts until it is able to successfully infect another host, e.g., host $H_3$. Thus, the first AD event recognized by the correlation engine is host $H_1$ as a client of a certain protocol (e.g., protocol-x) contacting host $H_2$, which is shown by block 41. Block 42 shows host $H_2$ as a server of protocol-x communicating with host $H_1$. The next event in the sequence is host $H_2$, now acting as a client of protocol-x, contacting host $H_3$, is represented by block 43. The key event of host $H_2$ becoming a client just after being a server, is referred to as role-reversal behavior at host $H_2$ using protocol-x. This role-reversal behavior indicates to correlation engine 32 that host $H_2$ is compromised in the same manner as host $H_2$, and is exhibiting the same type of replicating behavior characteristic of a worm outbreak. According to one embodiment of the present invention, a worm outbreak is declared when a predetermined number (e.g., 40) of role-reversal events are observed occurring within a relatively short time period (say, 1 second).

As soon as a worm outbreak has been identified as described above, the particular attack vector (e.g., TCP/445) is extracted for use by SEAP 37 or other devices, nodes, administrators, etc., involved in the attack mitigation process. The attack vector is particularly useful in mitigating the attack since, for example, it enables the shutting down of vulnerable services or compromised hosts or nodes.

Figure 8:
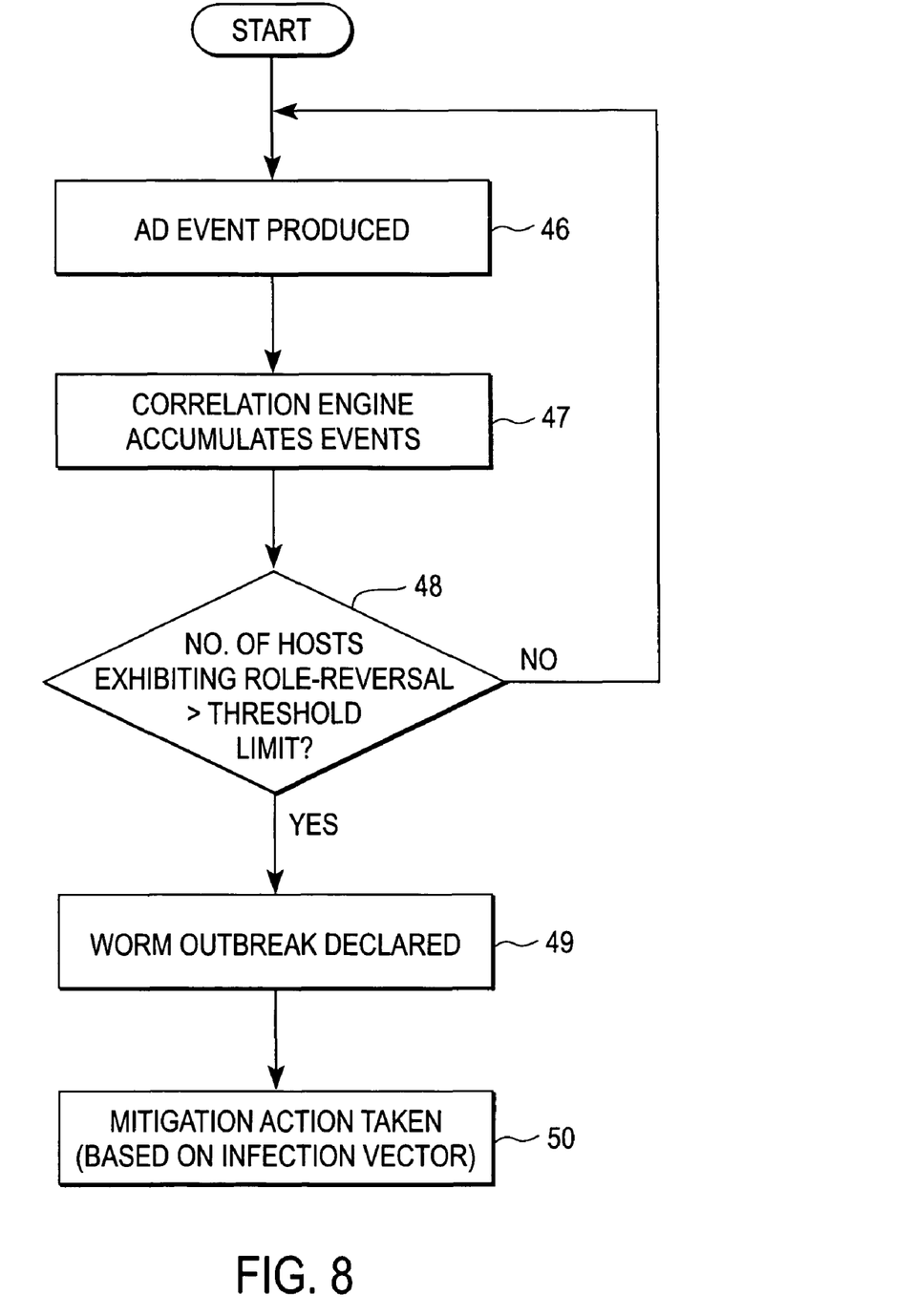
FIG. 8 is a flowchart showing worm detection and mitigation processes according to one embodiment of the present invention.

FIG. 8 is a flowchart showing the overall worm detection and mitigation processes according to one embodiment of the present invention. The process begins with the production of an AD event (block 46), followed by accumulation of information about the event (e.g., host, application, protocol) in storage by the correlation engine (block 47). Block 48 represents the periodic examination of the AD events by the correlation engine to determine whether a pattern of abnormal behavior exceeds a predetermined threshold limit. In the context of the description provided above, the key trigger occurs when a certain number of hosts exhibit role-reversal behavior within a given time period. If the abnormal activity is below the threshold limit, the monitoring and tracking of AD events continues as before. On the other hand, if the threshold limit has been exceeded, a worm outbreak is declared (block 49), worm alarm alerts are generated by the correlation engine, and mitigation actions are commenced based on the extracted infection vector (block 50).

It is appreciated that a variety of different mitigating actions may be taken by the IDS/IPS depending upon the particular infection vector. For example, if the infection vector involves TCP/80 (which is normally used as an Internet access interface) the mitigation action may not include blocking of that particular port. Instead, the port can remain open but all traffic to new hosts may be blocked. In other words, the knowledge database may be consulted to determine which destination websites each host normally communicates with; traffic to those websites will be allowed, but all traffic to new websites will be blocked. This action has the effect of isolating the worm outbreak. Of course, in other instances, infected hosts on the network may simply be shut down to halt further spread of the worm.

Still another alternative mitigating action is to re-direct all traffic associated with a particular service to an entirely different network or sub-network, removed from the corporate production network. Yet another mitigation option is to inspect all packets passing through the IDS node or certain gateway nodes on the network for identifying characteristics of the particular infection vector. In this manner, traffic may be halted (or approved) on a per packet basis.

It should also be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, or other type of non-transitory machine-readable medium suitable for storing electronic instructions.

Furthermore, although the present invention has been described in conjunction with specific embodiments, those of ordinary skill in the computer networking arts will appreciate that numerous modifications and alterations are well within the scope of the present invention. Accordingly, the specification and drawings are to be regarded in an illustrative rather than a restrictive sense.

We claim:

1. An intrusion detection system (IDS) for a network that includes a plurality of hosts, comprising:
    a knowledge database containing a baseline of normal host behavior; and
    a correlation engine that monitors network activity with reference to the knowledge database, the correlation engine accumulating information about anomalous events occurring on the network and periodically correlating the anomalous events to identify one or more patterns in abnormal behavior, the correlation engine generating a worm outbreak alarm when a number of the hosts exhibiting a role-reversal behavior exceeds a predetermined threshold, the role-reversal behavior comprising a specific pattern wherein one or more hosts become a client just after being a server.

2. The IDS of claim 1 further comprising:
    one or more processors; and
    one or more modules coupled to the processor, the one or more modules implement the knowledge database and correlation engine.

3. The IDS of claim 2 wherein the information includes an infection vector characteristic of a worm.

4. The IDS of claim 3 wherein the infection vector involves a particular protocol, and the one or more processors are operable to stop a new behavior of a host on the network that involves the particular protocol.

5. An intrusion detection system (IDS) for a network that includes a plurality of hosts, comprising:
    a processor unit operable to monitor network activity with reference to a knowledge baseline of normal host behavior, the processor unit being further operable to accumulate information about anomalous events occurring on the network and periodically correlate the anomalous events to identify one or more patterns in abnormal behavior, the processor unit generating a worm outbreak alarm when a number of infected hosts exhibiting a role-reversal behavior exceeds a predetermined threshold, the role-reversal behavior comprising a specific pattern wherein one or more hosts become a client just after being a server; and
    one or more processors operable to isolate the infected hosts in real-time.

6. A computer-implemented method for discovering worm outbreak on a network comprising:
    detecting a number of hosts on the network exhibiting role-reversal behavior wherein a first host acts as a client of a protocol and contacts a second host, the second host acts as a server of the protocol and replies to the first host, a role-reversal event occurring when the second host immediately thereafter acts as a client of the protocol and contacts a third host;
    determining that contact of the second host by the first host is an anomalous event in consultation with a knowledge database containing a baseline of normal host behavior;
    storing information about the anomalous event in a memory;
    issuing a worm outbreak alarm when an accumulated number of role-reversal events detected among the hosts within a specified time period exceeds a predetermined threshold.

7. The computer-implemented method of claim 6 further comprising: gathering information about network activity over a predetermined period of time to establish the baseline of normal host behavior.

8. The computer-implemented method of claim 7 further comprising extracting an infection vector characteristic of the worm outbreak from the stored information about the anomalous event after issuance of the worm outbreak alarm.

9. A computer-implemented method for real-time discovery/mitigation of a worm outbreak on a network comprising:
    establishing a knowledge base of normal host behavior for the network;
    consulting the knowledge base to detect anomalous events on the network;
    storing information about the anomalous events in a memory;
    correlating the anomalous events to identify one or more patterns in abnormal behavior which comprises a first host acting as a client of a protocol and contacting a second host, the second host acting as a server of the protocol and replying to the first host, a role-reversal event occurring when the second host immediately thereafter acts as a client of the protocol and contacts a third host; and
    issuing a worm outbreak alarm when an accumulated number of role-reversal events detected among the hosts within a specified time period exceeds a predetermined threshold.

10. The computer-implemented method of claim 9 further comprising:
stopping a behavior from a host involving the protocol.

11. The computer-implemented method of claim 9 further comprising:
isolating the infected hosts in real-time.

12. The computer-implemented method of claim 9 further comprising:
extracting an infection vector characteristic of the worm outbreak from the stored information.

13. The computer-implemented method of claim 9 further comprising:
updating the knowledge base with the stored information.

14. A non-transitory computer-readable storage medium encoded with a computer program, which, when executed, is operable to:
detect a number of hosts on the network exhibiting role-reversal behavior wherein a first host acts as a client of a protocol and contacts a second host, the second host acts as a server of the protocol and replies to the first host, a role-reversal event occurring when the second host immediately thereafter_ acts as a client of the protocol and contacts a third host;
determine that contact of the second host by the first host is an anomalous event in consultation with a knowledge database containing a baseline of normal host behavior;
store information about the anomalous event in a memory; and
issue a worm outbreak alarm when an accumulated number of role-reversal events detected among the hosts within a specified time period exceeds a predetermined threshold.

15. The non-transitory computer-readable storage medium of claim 14 wherein execution of the computer program is further operable to gather information about network activity over a predetermined period of time to establish the baseline of normal host behavior.

16. The non-transitory computer; readable storage medium of claim 14 wherein execution of the computer program is further operable to extract an infection vector characteristic of the worm outbreak from the stored information about the anomalous event.

17. The non-transitory computer-readable storage medium of claim 14 wherein execution of the computer program is further operable to isolate the hosts infected by the worm outbreak in real-time.

* * * * *